United States Patent [19]

Sakashita et al.

[11] Patent Number: 4,510,168

[45] Date of Patent: Apr. 9, 1985

[54] PROCESS FOR SEALING BODY AND CAP OF GELATIN HARD CAPSULE AND APPARATUS THEREFOR

[75] Inventors: Shigeru Sakashita, Gifu; Takeshi Nakagawa, Kagamigahara; Takayuki Ohwaki; Yasuo Miyake, both of Inuyama, all of Japan

[73] Assignee: Eisai Co., Ltd., Tokyo, Japan

[21] Appl. No.: 589,976

[22] Filed: Mar. 15, 1984

[30] Foreign Application Priority Data

Mar. 24, 1983 [JP] Japan ................................ 58-49579

[51] Int. Cl.[3] ........................................ A01N 25/00

[52] U.S. Cl. ........................................ 427/3; 427/37

[58] Field of Search ............................ 427/3; 424/37

[56] References Cited

U.S. PATENT DOCUMENTS 4,278,633 7/1983 Fuijii ...................................... 427/3

FOREIGN PATENT DOCUMENTS 2118883 12/1970 France ................................... 427/3

*Primary Examiner*—Sam Silverberg

*Attorney, Agent, or Firm*—Fulbright & Jaworski

[57] ABSTRACT

This invention provides a process for sealing a body and a cap of a capsule which comprises successively dipping a gelatin hard capsule containing drugs one by one in a mixed solvent of water and ethanol whose volume ratio to water is 50–55%, thereafter taking said capsule out of this solvent and drying each capsule separately.

1 Claim, 4 Drawing Figures

PROCESS FOR SEALING BODY AND CAP OF GELATIN HARD CAPSULE AND APPARATUS THEREFOR

FIELD OF THE INVENTION

This invention relates to a process for sealing a body and a cap of a gelatin hard capsule that has received drugs therein, and relates to an apparatus used therefor.

BACKGROUND OF THE INVENTION

It has hitherto occurred that fitting of the cap on the body of the gelatin hard capsule that have received drugs therein loosens and a gap is caused therebetween or the cap falls out, whereby the drugs received within the capsule leak or are substituted for other ones. In order to prevent the occurrence of such disadvantages or hold the drugs in a stable state, therefore, it has usually been employed to seal its coupling portion.

For that purpose, various measures have been taken such as sealing of the coupling portion with a tape, fitting of a convex ring formed on the one of the coupling portion in a concave ring formed on the other of the coupling portion and the like. However, every one of these measures was disadvantageous in that it required much trouble and was low in efficiency. Therefore instead of these measures, the measure has been utilized which comprises the steps of placing capsules in a coating pan, spraying thereon a mixed solution of water and a volatile organic solvent whose volume ratio to water is 75–80%, rotating said pan for stirring, thus sealing and thereafter drying. However, this measure is defective in that satisfactory sealing is attained with difficulty, small capsules Nos. 4–5 adhere to each other and are deformed by crushing, distortion and the like, and further its efficiency is deteriorated owing to batch-treatment.

SUMMARY OF THE INVENTION

It is an object of this invention to provide a sealing process that is capable of eliminating the drawbacks inherent in the conventional sealing processes, effecting sealing accurately as well as efficiently, and assuring that there is no possiblity of sealed capsules being deformed.

Said object can be attained by a process according to this invention which comprises continuously dipping each capsule in a mixed solvent of water and ethanol whose volume ratio to water is in the range of 50–55%, thereafter taking each capsule out of this solvent, and drying each capsule.

In one embodiment of this invention, the time required for dipping each capsule in the solvent is 1–10 seconds, preferably 1–5 seconds, and drying is carried out by passing each capsule first through a cold wind zone and in succession through a hot wind zone of 25°–35° C. This treatment induces the solvent to evaporate at an appropriate time and brings about neither too much nor too little resolution of gelatin, thereby obtaining a satisfactory sealing state.

It is another object of this invention to provide a sealing apparatus that is capable of sealing a gap between the body and the cap automatically, efficiently and further accurately.

Said object can be attained by providing a sealing apparatus according to this invention which comprises including a solvent tank storing a solvent; a rotary disk that is mounted on a horizontal rotary shaft and provided, on its outer peripheral surface, with capsule-receiving portions, each portion receiving only one capsule, this capsule-receiving portion being designed to pass through the solvent stored in the solvent tank; and a drying means for separately drying the capsules taken out above the surface of said solvent from the capsule-receiving portions and is provided with a capsule transfer means inside thereof. That is to say, capsules are separated from each other without being disturbed by others, successively dipped in the solvent, and dried for evaporation of the solvent, whereby uniform sealing can be attained and deformation of capsules can be prevented.

It is a further object of this invention to provide an apparatus that is capable of automatically supplying capsules one by one in the capsule-receiving portions on the rotary disk rapidly as well as accurately, and then automatically discharging the dipped capsule toward a drying means.

Said object can be attained by providing a sealing apparatus according to this invention which comprises providing, above the rotary disk, a capsule store tank equipped, at its lower part, with a means for successively supplying capsules one by one, and further providing a discharge means disposed above the surface of the solvent stored in the solvent tank.

In one embodiment of this invention, a capsule-drying means includes a first drying chamber, within which a cold wind zone is formed and a second drying chamber connected to this first drying chamber, inside said second drying chamber there being formed a hot wind zone, inside these first and second drying chambers there being provided a capsule-transfer means comprising roller conveyors.

Said embodiment, furthermore, is designed so that by the provision of through holes communicating with the capsule-receiving portion on the side of the rotary disk; an air suction means which is located below the capsule-supply means of the capsule store tank and opposed to one of said through holes; and an air blast means which is disposed opposed to one of said through holes at the place corresponding to the capsule discharge means, the internal pressure of the capsule-receiving portion is reduced by way of the through hole by the action of the air suction means so as to receive the capsule accurately by suction within the capsule-receiving portion and at the same time the internal pressure of the capsule-receiving portion is increased by way of the through hole by the action of the air blast means so as to press-discharge the capsule accurately from the inside of the capsule receiving portion.

These and other features and advantages of this invention will become apparent upon reading the following description, which, along with the appended drawings, describes and discloses a preferred illustrative embodiment of the invention in detail.

The detailed description of the preferred embodiment makes reference to the accompanying drawings.

DETAILED DESCRIPTION OF THE INVENTION

Figure 1:
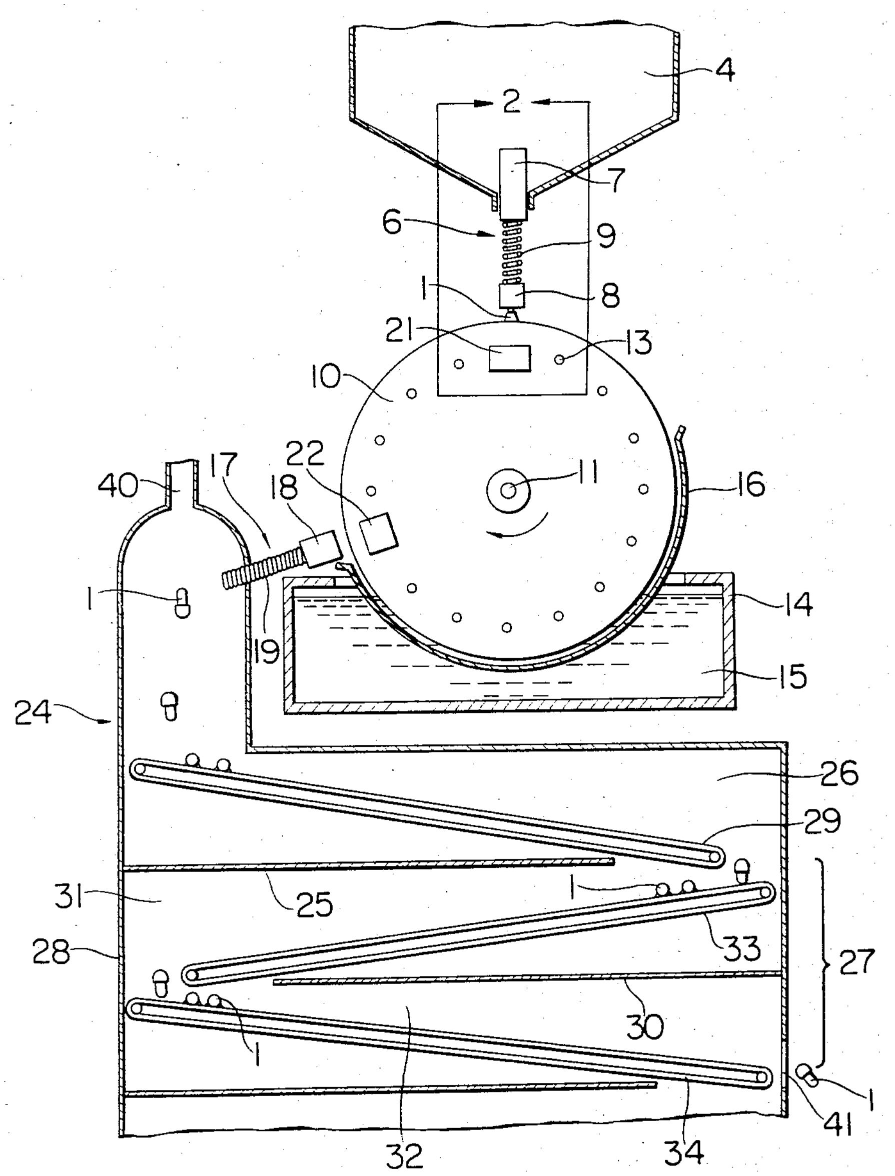
FIG. 1 is a partly cutaway elevational view of one embodiment of a sealing apparatus according to this invention.

In the drawing, reference numeral 1 denotes a gelatin hard capsule which comprises a body 2 received drugs therein and a cap 3 put thereon.

Reference numeral 4 denotes a capsule store tank whose bottom surface is of a downwardly slant pyramidal shape and whose front end is provided with an opening 5. This opening is provided with a supply means 6. This supply means 6 comprises an inlet pipe 7 fitted slidably in the opening 5, an outlet pipe 8 disposed concentrically at a fixed distance below this inlet pipe 7 and a pipe-shaped expansion spring 9. The inlet pipe 7 is allowed to vertically move with a fixed stroke by the aid of an operating means attached to a frame (not shown), the outlet pipe 8 is fixed to a frame and the spring 9 is fixed on the upper end of the outlet 8. These means 7, 8, and 9 are arranged concentrically and the inside diameter thereof is slightly larger than that of the capsule 1.

Reference numeral 10 denotes a rotary disk disposed below the capsule store tank 4, and its shaft 11 is designed to be rotated continuously in the direction of the arrow normally at a speed of 20 rpm by a driving means (not shown). On the outer periphery of this disk 10, there are provided capsule-receiving portions 12. These capsule receiving portions are arranged at regular intervals in the peripheral direction, and each of them is a blank hole that is slightly larger in length and diameter than the capsule. And, on one side of the disk 10 there is provided through holes 13 communicating with the capsule-receiving portions 12.

Reference numeral 14 denotes a solvent tank disposed below the disk 10.

This solvent tank 14 receives a mixed solvent 15 of water and ethanol whose volume ratio to water is 50–55%, and part of the disk 10 is designed to be dipped in this solvent 15.

Reference numeral 16 denotes a guide plate disposed, below the disk 10, leaving a fixed distance against and parallel to the outer periphery of the disk. This guide plate 16 acts to prevent the capsules 1 received in the receiving portions 12 from falling down during rotation of the disk 10.

Reference numeral 17 is a means that is located above the liquid surface of the solvent 15 for receiving the capsule 1 which is discharged from the receiving portion 12 after completion of dipping and further discharging it. Said means 17 comprises a discharge pipe 18 and a pipe-shaped spring 19.

Reference numerals 21 and 22 each denotes an air suction means and an air blast means attached to a frame (not shown). The air suction means 21 is located below the capsule supply means 6 and opposed to the through hole 13, while the air blast means 22 is located corresponding to the discharging means 17 and opposed to the through hole 13.

Reference numeral 24 denotes a drying means. This drying means 24 comprises a housing 28 which inside has been defined into an upper first drying chamber 26 and a lower second drying chamber 27 by means of a partition 25. The upper part of this housing 28 is provided with an outlet end of the spring 19 and the downward drying chamber 26 includes an inclined first roller conveyor 29. And, this drying chamber 26 is designed to be supplied with a cool wind by an air supply means (not shown). The second drying chamber 27 is defined into an upper second drying chamber 31 and a lower second drying chamber 32 by means of a partition 30, said drying chambers 31 and 32 being provided with a second roller conveyor 33 and a third roller conveyor 34 inclined in the direction opposite to each other. These roller conveyors 29, 33 and 34 are all same in structure. Particulars thereof will be explained with reference to FIG. 4. Both ends of a shaft 36 of a conveyor roller 35 are supported rotatably by a sprocket chain 37, and a pinion 38 is attached to its one end. This pinion 38 is in mesh with a rack 39 mounted on the frame so as to be parallel with at least a forward moving portion of a chain 37, and the roller 35 is arranged to rotate round its own axis depending on this meshing relationship and corresponding to the movement of the chain 37. This second drying chamber 27 is supplied with a hot wind by means of an air blast means (not shown) so that the inside of said chamber may be maintained at a temperature of 25°–35° C.

In FIG. 1, reference numerals 40 and 41 denote an air exhaust port and a capsule discharge port provided at the upper and lower parts of the housing 24 respectively.

The state of sealing the body 2 with the cap 3 of the capsule 1 by means of aforesaid sealing apparatus will be explained below.

Figure 2:
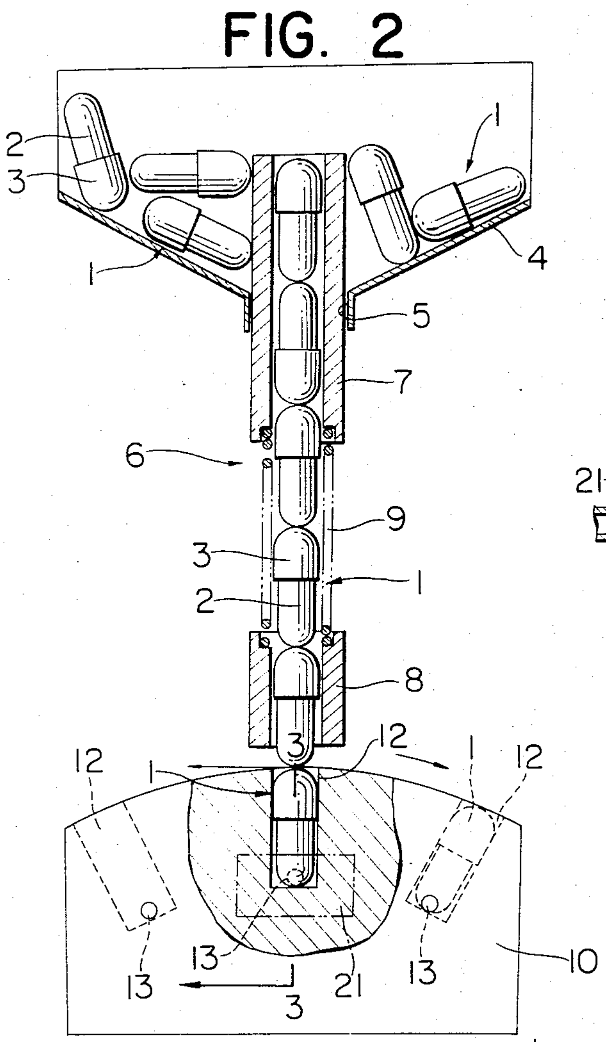
FIG. 2 is a partly cutaway enlarged view of the portion enclosed with the line 2 of FIG. 1.
Figure 3:
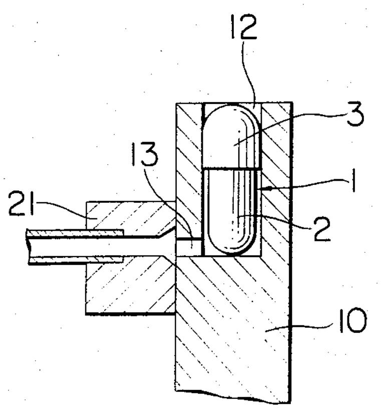
FIG. 3 is an enlarged view taken in the direction of the arrows along the line 3—3 of FIG. 2.

The capsules 1 are conveyed by means of a proper conveyor (not shown), and are stored in the store tank 4 as shown in FIG. 2. At this time, the inlet pipe 7 moves vertically, and consequently capsules 1 are inserted into said pipe, spring 9 and outlet pipe 8 in a longitudinal row as illustrated in the drawing, and the capsule located at the lowest end falls in the receiving portion 12 with the rotation of the disk 10. However, as the internal pressure of the receiving portion 12 has been reduced by way of the through hole 13 by means of the air suction means 21, the said capsule 1 can be received in the receiving part 12 with accuracy.

The capsules 1 thus received in the receiving portions 12 are successively dipped in the solvent 15 as the disk 10 rotates. At this time, however, there is no possibility of capsules falling down in the solvent tank 14 because their top portions move while abutting with the guide plate 16. The capsule is thus dipped in the solvent 15 for about 1–10 seconds, preferably 1–15 seconds, and thereafter the capsule 1 is separated and goes up from the solvent 15 and arrives at the air blast means 22, where the capsule 1 is thrust out of the receiving portion 12 by the action of the air supplied in the receiving portion 12 by way of the through hole 13 from the air blast means 22.

By dipping the capsule in the solvent 15, the capsule 1 is film-coated with the solvent, and simultaneously owing to the capillary phenomenon, the solution also enters into the connecting portion of the body 2 with the cap 3 for sealing the inside of the connecting portion.

Figure 4:
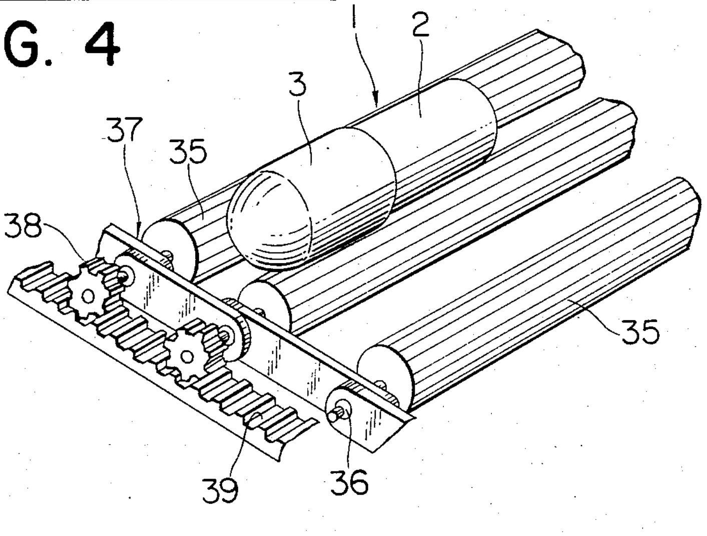
FIG. 4 is a partly enlarged slant view of a transfer means of the sealing apparatus illustrated in FIG. 1.

The thus treated capsules 1 are thrusted out of the receiving portions 12, are mounted one by one on the first roller conveyor as illustrated in FIG. 4 in the first drying chamber of the drying means 24 and are transported. Then, the capsules are transferred through the second drying chamber 27 mounting on the successive second and third roller conveyors 33 and 34, and are discharged to the outside from the discharge port 41. At that time, although the inside of the first drying chamber 26 is in the state of cool wind zone, ethanol evaporates due to its rapid evaporating property and the water content alone remains. Accordingly, the water dissolves the gelatin and sealing is effected. In this state, however, the gelatin is dissolved more than actually required. In order to remove this disadvantage, therefore, the capsule 1 is dried in an atmosphere of 25°-35° C. in the second drying chamber 27 for the purpose of evaporating the water. During the aforesaid drying operation, the capsule 1 on the roller 35 that rotates round its own axis by meshing of the pinion 38 with the rack 39 is also allowed to rotate round its own axis, whereby the round surface of the capsule 1 is dried uniformly and therefore there is no possibility of causing deformation. Next, experimental results obtained from sealing conducted by aforesaid apparatus will be given below.

EXPERIMENTAL EXAMPLE 1

100 capsules (No. 2) were subjected to sealing operations by varying the concentration (%) of ethanol in the solvent and the dipping time. The thus treated capsules were examined in respect of their sealed state. The number of capsules, which have been judged no good, is as shown in the following table.

It can be seen from the following table that the concentration of ethanol used in the solvent is preferable to be 50-55% and the time required for dipping is 1-10 seconds, preferably 1-5 seconds.

| Ethanol | Time for dipping | | |
|---|---|---|---|
| concentration % | 1 second | 5 seconds | 10 seconds |
| 90 | 100 | 98 | 94 |
| 80 | 94 | 88 | 80 |
| 70 | 80 | 60 | 10 |
| 65 | 60 | 10 | 0 |
| 60 | 10 | 0 | 0 |
| 55 | 0 | 0 | 0 |
| 50 | 0 | 0 | 0* |
| 45 | 0 | 0* | 0* |
| 40 | 0* | 0* | 0* |

Note:
*capsule deformed

EXPERIMENTAL EXAMPLE 2

5 hundred thousand 10/g of vitamine A palmitate, which is known as a medicine being easily subject to airing, were filled in No. 5 capsules, and said capsules were sealed using the aforesaid apparatus and a solvent having an ethanol concentration of 55%. Thus sealed capsules and non-sealed capsules were placed in a JIS glass bottle and kept therein at 45° C. for 1 month. Thereafter, both capsules were tested in stability. This stability test was done in the manner of calculating the ratio of the initial medicine content to the medicine content after the lapse of 1 month. The thus obtained results are as shown below:

| | |
|---|---|
| Sealed capsules | 100% |
| Non-sealed capsules | 85% |

It is evident from the aforegoing that even the relatively small capsules, which have been subjected to the sealing operation previously, are superior in stability as compared with non-sealed capsules. Accordingly, it can be seen that the encapsuled medicine, which is easily subject to airing, is guaranteed in stability than before.

EXPERIMENTAL EXAMPLE 3

A liquid medicine comprising nicotinic-acidal-α-tocopherol and oleic-acid mixed previously in the ratio of 2:1 was filled in a No. 2 capsules, and sealed with a solvent whose ethanol concentration is 55%. The thus obtained 100 capsules and the non-sealed 100 capsules were placed separately in petri dishes, and two petri dishes were prepared for each kind. Then, the sealed petri dishes and the non-sealed petri dishes were each kept at 45° C. and 55° C. for 1 week. Then, the presence and absence of leakage in the connecting portion of the body with the cap were examined. The examined results are expressed in the ratio (%) of the number of leaked capsules to the total number of tested capsules as follows.

| | Temperature | |
|---|---|---|
| Kind | 45° C. | 55° C. |
| Sealed capsules | 0% | 0% |
| Non-sealed capsules | 100% | 100% |

It can be seen from the aforegoing that the capsules sealed by means of said apparatus are exceedingly superior in the ratio of leakage as compared with the non-sealed capsules.

Although a particular preferred embodiment of the invention has been disclosed in detail for illustrative purposes, it will be recognized that variations or modifications of the disclosed apparatus, including the rearrangement of parts, lie within the scope of the present invention.

It is needless to say that for instance the disk 10 may be mounted on the shaft 11 plurally in a row, and this may be accompanied by the provision of supply means 6, air suction means 21, air blast means 22, discharging means 17 and the like in necessary numbers.

What is claimed is:

1. A process for sealing a body and a cap of a gelatin hard capsule containing drugs therein, wherein each capsule is continuously dipped for a time of 1-10 seconds, preferably 1-5 seconds, in a mixed solvent of water and ethanol whose volume ratio to water is in the range of 50-55%, thereafter taking each capsule out of this solvent, and drying each capsule separately by passing it first through a cold wind zone and in succession through a hot wind zone of 25°-35° C.

* * * * *